United States Patent
Markarian et al.

(10) Patent No.: US 12,048,909 B2
(45) Date of Patent: Jul. 30, 2024

(54) METHOD FOR COOLING/QUENCHING OF HIGH-TEMPERATURE GASEOUS STREAM OF METAL—OR METALLOID HALIDES IN CARBIDE DERIVED CARBON PRODUCTION

(71) Applicant: OÜ Skeleton Technologies Group, Tallinn (EE)

(72) Inventors: Ohannes Markarian, Bitterfeld-Wolfen (DE); Sebastian Pohlmann, Tallinn (EE); Jaan Leis, Tallinn (EE)

(73) Assignee: OÜ Skeleton Technologies Group, Tallinn (EE)

( * ) Notice: Subject to any disclaimer, the term of this patent is extended or adjusted under 35 U.S.C. 154(b) by 726 days.

(21) Appl. No.: 17/280,531

(22) PCT Filed: Sep. 26, 2019

(86) PCT No.: PCT/EP2019/076124
§ 371 (c)(1),
(2) Date: Mar. 26, 2021

(87) PCT Pub. No.: WO2020/064976
PCT Pub. Date: Apr. 2, 2020

(65) Prior Publication Data
US 2022/0040660 A1  Feb. 10, 2022

Related U.S. Application Data
(60) Provisional application No. 62/736,543, filed on Sep. 26, 2018.

(51) Int. Cl.
*C01B 32/00* (2017.01)
*B01J 4/00* (2006.01)
(Continued)

(52) U.S. Cl.
CPC ............. *B01J 19/002* (2013.01); *B01J 4/008* (2013.01); *B01J 19/0013* (2013.01);
(Continued)

(58) Field of Classification Search
CPC .......... C01B 32/05; C01B 32/00; B01J 19/00; B01J 19/0013
See application file for complete search history.

(56) References Cited

U.S. PATENT DOCUMENTS

| 2,446,181 | A | 8/1948 | Kraus |
| 2,718,279 | A | 9/1955 | Kraus |

(Continued)

OTHER PUBLICATIONS

European Patent Office, International Search Report of PCT/EP2019/076124, published Apr. 2, 2020.
(Continued)

*Primary Examiner* — Caixia Lu
(74) *Attorney, Agent, or Firm* — United One Law Group LLC; Kongsik Kim; Jhongwoo Peck

(57) ABSTRACT

A method and an apparatus for reducing the corrosion of a condenser in carbide derived carbons (CDC) production where cooling/quenching of a gaseous stream metal or metalloid halide is performed by direct contact of gaseous stream with liquid cooling agent before condenser, without utilizing a heat exchanger for the temperature range above 300° C., while keeping purity of gaseous stream of metal or metalloid halide constant. The apparatus comprises a reactor for carbide to carbon conversion and a condenser for collecting the by-produced metal- or metalloid chloride, and a cooling unit comprising a tank of liquid cooling agent. Temperature of the gas stream entering the condenser is reduced by heat absorbed in vaporization of a liquid metal- or metalloid halide introduced from the tank of liquid cooling agent through by supply pump, through the supply flow valve into the gaseous stream at the exit of the reactor.

6 Claims, 2 Drawing Sheets

(51) Int. Cl.
  *B01J 19/00*   (2006.01)
  *C01B 32/05*   (2017.01)
  *C23F 15/00*   (2006.01)

(52) U.S. Cl.
  CPC .............. *C01B 32/05* (2017.08); *C23F 15/00* (2013.01); *B01J 2219/00121* (2013.01)

(56) References Cited

U.S. PATENT DOCUMENTS

| | | |
|---|---|---|
| 2,870,869 A | 1/1959 | Mahler |
| 7,803,345 B2 | 9/2010 | Leis et al. |
| 2012/0219488 A1* | 8/2012 | Dash ....................... C01B 32/00 |
| | | 423/445 R |

OTHER PUBLICATIONS

J. L. Aller et al., The Time and Temperature Dependence of AISI 316L Corrosion in Chlorosilane Environments, ECS Transactions, Jul. 29, 2015, pp. 41-51, vol. 66, No. 18.

* cited by examiner

METHOD FOR COOLING/QUENCHING OF HIGH-TEMPERATURE GASEOUS STREAM OF METAL—OR METALLOID HALIDES IN CARBIDE DERIVED CARBON PRODUCTION

PRIORITY

This application is a U.S. national application of the international application number PCT/EP2019/076124 filed on Sep. 26, 2019 and claiming priority of U.S. Provisional application 62/736,543 filed on Sep. 26, 2018 the contents of all of which are incorporated herein by reference.

FIELD OF THE INVENTION

The present invention is related to the advanced production process of microporous carbon. The herein described apparatus and method is related to the cooling/quenching of gas phase streams, associated with the manufacture of porous carbon and metal halides from metal carbides. In more detail, the described apparatus and method herein relates to processes and equipment for a continuous cooling/quenching of the gas phase resulting from the halogenation of metal carbides from porous carbon and metal halide, by means of direct contact.

BACKGROUND OF THE INVENTION

Porous carbon materials are found to be used in applications ranging from energy storage over filtering and adsorption processes. Especially in energy storage as well as in filtering applications, the high specific surface area of this class of material is of interest. Carbide derived carbons (CDCs) represent a class of high-performance microporous carbons with narrow pore-size distribution and high surface-to-volume ratio. CDCs can be manufactured by chemically stripping metal carbides from their metalloid contents by halogenation at elevated temperatures, leaving metal-chlorides and the microporous carbon as the product.

Since CDCs are formed during extraction of non-carbon atoms from the carbide structural network, the precise nanostructure and properties of carbon depend significantly on the template, i.e. precursor carbide. Carbide materials which can be used to produce CDCs may be in the form of powder or pellets or film. From the point of view of structural order, the precursor carbide may be monolithic crystal or polycrystalline or porous biomorphic carbide or of any other morphology.

There are several methods to extract the non-carbon atoms from carbide; the most wide-spread is a chemical extraction with halogen gas at high temperature as Equation 1 of the chemical reaction.

$$MC_x + y/2 X_2 \rightarrow MX_y + xC \qquad \text{Equation 1}$$

In one embodiment, the halogen gas is Chlorine gas ($Cl_2$). According to the mass-balance of chlorination reactions, the theoretical yield of carbon (CDC) from different carbides may range from ~6% (wt.) in the case of molybdenum carbide to almost 30% (wt.) for silicon carbide. However, the main product of carbide chlorination reaction is a chloride of the respective carbide-forming metal or metalloid ($MCl_y$) as shown in TABLE 1.

TABLE 1

Relative weight-distribution of products (CDC and $MCl_y$) from different carbides by chlorination treatment.

| Carbide ($MC_x$) | Chemical reaction | CDC, % | $MCl_y$, % |
|---|---|---|---|
| SiC | SiC + 2Cl2 → SiCl4 + C | 6.6 | 93.4 |
| TiC | TiC + 2Cl2 → TiCl4 + C | 5.9 | 94.1 |
| Mo2C | Mo2C + 5Cl2 → 2MoCl5 + C | 4.2 | 95.8 |
| Al4C3 | Al4C3 + 6Cl2 → 4AlCl3 + 3C | 4.0 | 96.0 |
| B4C | B4C + 6Cl2 → 4BCl3 + C | 6.0 | 94.0 |
| ZrC | ZrC + 2Cl2 → ZrCl4 + C | 4.9 | 95.1 |
| NbC | 2NbC + 5Cl2 → 2NbCl5 + 2C | 4.2 | 95.8 |
| HfC | HfC + 2Cl2 → HfCl4 + C | 3.6 | 96.4 |

Gaseous streams associated with CDC production are composed of metal halides and halogen(s) gas or its hydrogen derivatives. For collecting the liquid metal halide from gaseous stream, the stream coming out from reactor is directed into the condenser. Due to CDC production reaction conditions, gaseous stream leaves reactor at elevated temperatures of over 600° C. Metal halogen(s) or metal chlorides are known to cause high corrosion rates of metal alloys, which therefore require the use of specialty materials as material of construction for the condenser. Corrosion of metal alloys introduces undesired contaminants to gaseous stream. Even specialty materials can introduce contaminants at elevated temperatures.

Typical construction material, 316L SS (Stainless Steel), which can be used for the condenser, has a recommended upper limit of operation with dry Chlorine contact, as per (Special Metals Corporation, publication number SMC-026, 2000), of 343° C. (Table 2). This decreases corrosion rates substantially, even more so at less than 300° C. TABLE 2 below shows such upper limits to several special alloys.

TABLE 2

Corrosion resistance of nickel alloys and other commercially available alloys

| Material | Approximate temperature at which given corrosion rate is exceeded in short time tests in dry chlorine, ° F. (° C.) | | | Suggested upper temperature limit for continuous service, ° F. (° C.) |
|---|---|---|---|---|
| | 30 mpy (0.76 mm/a) | 60 mpy (1.52 mm/a) | 120 mpy (3.05 mm/a) | |
| Nickel 201 | 950 (510) | 1000 (538) | 1100 (593) | 1000 (538) |
| INCONEL ® alloy 600 | 950 (510) | 1000 (538) | 1050 (565) | 1000 (538) |

TABLE 2-continued

Corrosion resistance of nickel alloys and other commercially available alloys

| Material | Approximate temperature at which given corrosion rate is exceeded in short time tests in dry chlorine, °F. (°C.) | | | Suggested upper temperature limit for continuous service, °F. (°C.) |
| --- | --- | --- | --- | --- |
| | 30 mpy (0.76 mm/a) | 60 mpy (1.52 mm/a) | 120 mpy (3.05 mm/a) | |
| INCONEL ® alloy C-276 | 900 (482) | 1000 (538) | 1050 (565) | 950 (510) |
| MONEL ® alloy 400 | 750 (399) | 850 (454) | 900 (482) | 800 (426) |
| AISI ® 316 stainless steel | 600 (315) | 650 (343) | 750 (3999 | 650 (343) |
| AISI ® 304 stainless steel | 550 (288) | 600 (315) | 650 (343) | 600 (315) |
| Deoxidized copper | 350 (177) | 450 (232) | 500 (260) | 400 (204)[b] |
| Carbon steel | 250 (121) | 350 (177) | 400 (204) | 400 (204)[c] |
| Aluminum | 250 (121) | 300 (149) | 300 (149) | 250 (121)[d] |

DISCLOSURE OF INVENTION

One objective of this invention is improving the metal carbide to CDC conversion technology for the simultaneous production of metal halide from gaseous stream by-produced in course of CDC production by providing a solution to the problem of accelerated corrosion of materials of construction used within the process in question.

In order to reduce the requirements for materials of construction as well as undesired contaminants in the condensed metal halide(s) stream, cooling/quenching of gaseous streams leaving the reactor is required prior to the gas stream getting in direct contact with cooler/condenser body and/or other corrosion-sensitive or possibly contaminating components at temperatures higher than 300° C. Reduced requirements for materials of construction result in decreased maintenance efforts and subsequently lowered costs of production. Decreased concentration of contaminants within the condensed metal halide(s) stream result in a higher value of the metal halide(s). In addition, the method according to present invention has impact on capital expenditures (less special material construction, reduction of process complexity, safety instrumentation) and reduced operating costs (maintenance, replacement, efficiency) in CDC process. It is an evidently a more controllable and efficient direct heat exchange process adjustable through the mixing ratio in order to maintain or increase metal or metalloid halide purity than previously described methods.

Metals and metalloids in scope of the present invention, for example, are boron, silicon, titanium, niobium and zirconium.

Gaseous exhaust streams associated with metal carbide-based CDC production methods contain high amounts of remaining reactive halogen gases, which must be neutralized in order to comply with regulatory laws. The presence of metal or metalloid halides (for example metal or metalloid chlorides) can disturb most neutralization methods using aqueous solutions (see equation 2 for the chemical reaction), resulting in a higher demand in neutralization agents and increased complexity of neutralization plants due to insoluble metal oxides as reaction products.

$$M(IV)Cl_4 + 2H_2O \rightarrow MO_2 + 4HCl \qquad \text{Equation 2}$$

In order to reduce the complexity of neutralization plants, the formation of metal oxides caused by the excess of metal halides in the exhaust stream after condensation must be prevented.

This invention offers a solution to minimize or even avoid the corrosion problems originated from the high temperature of a gaseous stream by-produced in carbide to carbon conversion. More precisely, this invention offers a method for precooling the gaseous stream before entering the condenser for liquefying the metal or metalloid halide (such as metal or metalloid chloride) from gaseous stream. Thus increasing the efficiency of the condensation process. This invention thus also presents a solution for minimizing the concentration of metal halides in the exhaust gas entering the neutralizing plant, reducing maintenance and complexity of this plant and loss of neutralizing agents.

Prior art teaches how to use the precooling of gaseous stream for condensing the room-temperature solid metal chlorides (e.g. FeCl3) out from the room-temperature liquid metal chloride (e.g. TiCl4 or SiCl4). Document GB783534 describes the usage of externally cooled pipes inside the cooling area for gaseous stream from carbothermal chlorination reactor of TiO2 containing ore. The documents GB679537 and GB803432 teach the condensation of metallic halides, especially iron chloride, from vaporous mixtures containing the chlorides of both titanium and iron by using the internal direct cooling with liquid titanium chloride injected in the gaseous stream. However, none of these documents does teach how to treat the gaseous stream, related to either CDC production or halogenation (for example chlorination) of metal carbide in general, for reducing or avoiding the corrosion caused by gaseous stream in condenser.

It is thus the objective of this invention to cool/quench gaseous streams consisting of metal or metalloid halides (for example metal chlorides) and halogen (for example Chlorine) gas without large surface area material interaction, so that corrosion of condenser materials can be avoided, reducing both material requirements (subsequently cost) and undesired contaminants in final cooled or condensed metal halide(s) stream.

DESCRIPTION OF FIGURES

The method according to the present invention will be described in detail below with references to the drawings, where

FIG. 2 shows simulation results estimating final temperature of output stream resulting from mixing of both hot and cold streams of metal or metalloid halide.

DETAILED DESCRIPTION OF THE EMBODIMENTS

Figure 1:
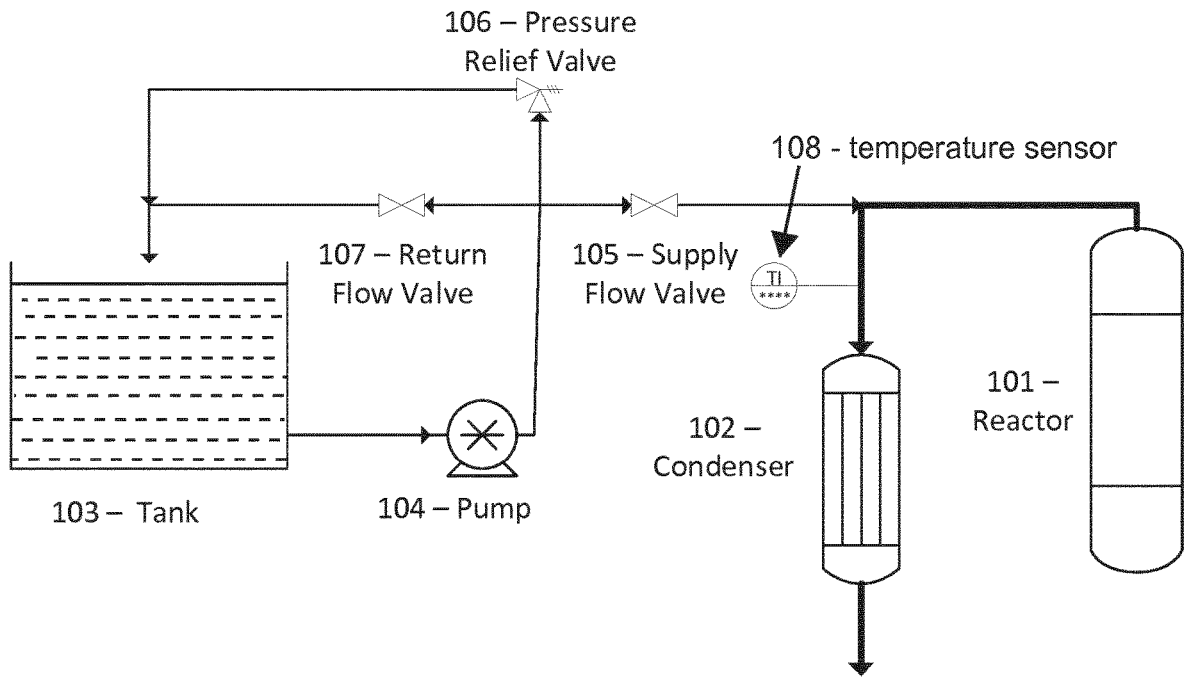
FIG. 1 shows how the apparatus for cooling of the gaseous stream is connected to the existing gas stream of CDC production equipment. An optimal number of elements (means) are used on the scheme, noting that additional components can be added for more control and insight of this section. The safety (pressure relief valve) is connected to the apparatus due to the nature of gear pumps operation (preferred type here), or any other suitable displacement pump type. Controlling the temperature can be done via manipulating of valve opening on the discharge of pump, which can be done by a pneumatic valve controlled by a temperature sensor after cooling/quenching section thus dealing with any variations or upsets in flow and/or temperature, or in simpler smaller units can be done manually if equipped with manual valves or additionally with variable frequency drive motor valves.

The invention describes a method of the cooling of the carbon production from metal- or metalloid carbide or the mixture of such carbides using extraction of non-carbon atoms from the metal- or metalloid carbide by reacting the carbide with halogen containing gas at high temperatures.

The method described in this document comprises the temperature reduction of the gaseous stream by cooling/quenching the gaseous stream via direct contact of gaseous stream with cooling agent, without utilizing a heat exchanger for the temperature range above 300° C., while keeping purity of stream constant or even increasing purity of stream. Constant gaseous stream composition is important, as for larger scale production a highly pure metal or metalloid halide is required for added value. According to this method, reduction of the gaseous stream temperature is performed before the gaseous stream inlet of condenser.

This invention claims that if a mixing ratio between gaseous stream and the cooling agent is utilized that achieves the temperature drop of gaseous stream before entering the condenser to about 300° C., minimum corrosion can be attained. Noting that any further drops in temperature would reduce the corrosion rate for the condenser.

Thermal shock is one consideration that needs to be taken into account when selecting values of parameters including but not limited to flowrates, reduction in temperature per unit length, and temperature difference per unit length. It is worth mentioning that Quartz or certain types of Graphite (reinforced carbon-carbon) can withstand thermal shocks, so a small section or several sections can be utilized for this step with one or more inlets of liquid metal halide(s). A liquid delivery head (into as stream) must provide enough surface area to enhance gas-liquid contact thus increasing mass and heat transfer characteristics.

In one embodiment, Silicon Carbide, SiC, is used for the synthesis of CDC according to the general reaction presented in Table 1, the temperature of this stream at the exit of chlorination reactor is about 900-1100° C., depending on the heating profile of reactor tube and the length of reaction zone. In the case of SiC chlorination, a composition of the gaseous stream is mostly Silicon Tetrachloride ($SiCl_4$, STC) and unreacted Chlorine gas ($Cl_2$). In addition to these main components, it is noted that this gaseous stream may contain an unknown amount of Hydrochloric acid (HCl) due to some moisture within the chlorine gas stream (99.8% purity), which in turn turns into HCl within the system.

The present invention enables several improvements in said CDC production technology. More particularly, this invention describes a novel method for the treatment of a gaseous stream produced in CDC synthesis from metal- or metalloid carbides using high-temperature treatment of carbides with halogen gases such as Chlorine. This invention is directly related to the following topics in CDC production:

Corrosion reduction within the condenser for the metal- or metalloid halides from the gaseous stream;
Reduction of corrosion contaminants within the condensate mainly consisting of metal- or metalloid halides.
Reduction or elimination of special material of construction
Preserving high purity of the gaseous stream of metal or metalloid halide In one embodiment, the cooling agent inserted in the gaseous stream is a liquid metal- or metalloid halide of the same chemical composition than the metal- or metalloid halide being condensed from the gaseous stream in condenser. In this case, the temperature reduction is achieved by the heat absorbed in vaporization of a liquid metal- or metalloid halide introduced into the gaseous stream at the exit of the reactor.

Due to this invention the corrosion rates are lowered and consequently less contaminates of metallic components of condenser show up in the condensate, improving the purity of by-produced metal- or metalloid halide, thus adding value it.

The description below provides detailed information on the apparatus and operation of the cooling system of the invention. The invention should not be viewed to be limited to the specific descriptions of the embodiments in this paragraph.

An apparatus for cooling of the gaseous stream according to this invention is explained by the drawing on figure FIG. 1. This apparatus comprises a reactor for carbide to carbon conversion, a condenser for collecting the by-produced metal- or metalloid chloride and a cooling unit comprising following main components:

Metal or metalloid halide tank 103 (for example Silicon tetrachloride (STC) tank (source));
Metal or metalloid halide Pump (preferably a gear pump) 104 connected to metal or metalloid halide tank 103 for introducing a stream of liquid metal or metalloid halide through supply flow valve 105 into the gaseous stream exit from reactor 101. The stream of liquid metal or metalloid halide is introduced to said gaseous stream before the stream enters into condenser 102;
Piping and valves:
Piping and valves comprises a supply flow valve 105, pressure relief valve 106 and return flow valve 107 correspondingly and piping for suppling liquid metal or metalloid halide to the gaseous stream from the reactor 101. The temperature controlling is done via manipulation of the supply flow valve 105 opening on the discharge of pump 104, which can be done by a pneumatic valve controlled by a temperature sensor 108 after cooling/quenching section thus dealing with any variations or upsets in flow and/or temperature, or in simpler smaller units can be done manually if equipped with manual valves.

The valves (105, 106, 107) are all connected to metal or metalloid halide pump 104, where supply flow valve 105 function is to introduce and control the parameters of liquid metal or metalloid halide stream introduced into gaseous stream exit from reactor. The parameter controlled by supply flow valve 105 is flow rate.

Noting that the liquid metal or metalloid halide is kept at a constant temperature near the boiling temperature of the liquid. This is to avoid slower sensible heat energy uptake by the liquid and brings it closer to the latent phase change energy region, where the bulk of energy is required thus reducing overall temperature of gas stream.

The supply flow valve 105 function is to control the flow of liquid metal or metalloid halide going into gas stream leaving reactor, going into condenser. This can be done via manipulating said return valve 107 opening on the discharge of pump. Return valve 107 provides additional control on flow and liquid supply piping resistance, in addition to having an option to return the flow back if required. Instrumentation can provide additional control over motor of pump with a variable frequency drive which can be connected to flow and temperature.

The pressure relief valve 106 is required due to the nature of positive displacement pumps to assure safety of system in case of clogs and sudden increase in pressure thus avoiding damage to piping and/or any other components of the apparatus.

The preferred type gear pump 104, or suitable positive displacement pump are such as rotary type positive displacement pump (e.g. Wendelkolben pump), reciprocating type positive displacement pump (e.g. piston, plunger or diaphragm pump) or linear type displacement pump (e.g. rope or chain pump) or any other type of pump suitable to perform the same task can be used (for example a centrifugal pump can be used as well).

A stream of liquid metal or metalloid halide from tank 103 is introduced into the gaseous stream right at the exit of the reactor 101, which in turn mixes with the gaseous stream and evaporates. The latent heat of vaporization required is taken from the hot gaseous stream thus reducing the temperature (sensible heat of gaseous stream). The flow of the liquid metal or metalloid halide is controlled by supply flow valve 105.

Depending on the amounts of gaseous stream and liquid metal or metalloid halide used, significant reductions in temperature are achieved. At the same time the purity of gaseous stream composition is kept constant, as for larger scale production a highly pure metal or metalloid halide is required for added value.

Figure 2A:
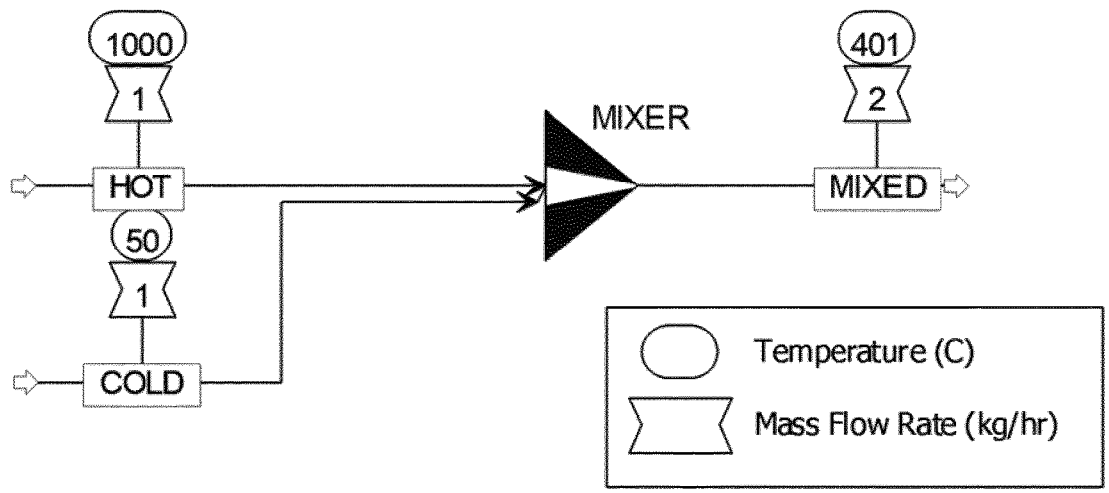
FIG. 2a illustrates the mixing of hot stream flow 1 kg/hour with cold stream flow of 1 kg/hour, i.e. the mixing ratio of hot stream flow and cold stream flow is 1:1.
Figure 2B:
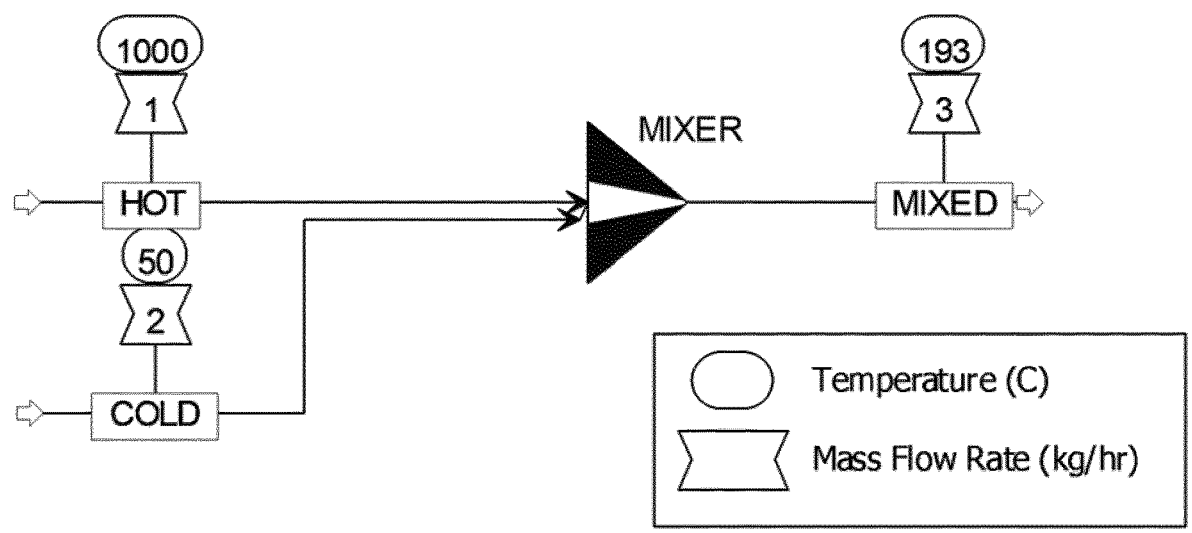
FIG. 2b illustrates the mixing of hot stream flow 1 kg/hour with cold stream flow of 2 kg/hour, i.e. the mixing ration of hot stream flow and cold stream flow is 1:2.

The mixing of both hot and cold streams of metal or metalloid halide is explained by figure FIG. 2, which shows simulation results estimating a final temperature of the output stream resulting from mixing of both hot and cold streams of metal or metalloid halide. Hot stream represents the gas stream of metal or metalloid halide leaving reactor, while cold stream represents liquid stream of metal or metalloid halide used for quenching. Example in FIG. 2a illustrates the mixing of hot stream flow 1 kg/hour with cold stream flow of 1 kg/hour, i.e. the mixing ratio of hot stream flow and cold stream flow is 1:1, and FIG. 2b illustrates the mixing of hot stream flow 1 kg/hour with cold stream flow of 2 kg/hour, i.e. the mixing ration of hot stream flow and cold stream flow is 1:2.

Latent heat of vaporization can be found in TABLE 3 below according to different sources. All sources indicate close values.

TABLE 3

Latent heat of vaporization of STC as metalloid halide according to different sources (web document https://webbook.nist.gov/cgi/cbook.cgi?ID=C10026047&Mask=4, accessed 20, Oct. 2018).

| $\Delta_{vap}H$ (kJ/mol) | Temperature (° K) |
|---|---|
| 29.9 | 305. |
| 30.4 | 288. |
| 30.2 | 290. |
| 30.1 | 303. |

Two cases are illustrated, a mixing flow ratio of 1:1 (case (a) in FIG. 2a) and 1:2 (case (b) in FIG. 2b). Higher flowrates of cold stream yield lower overall temperature of final output stream (mixture). As can be seen below in Table 4 that a flow ratio of 1:1 can be considered too low to achieve required temperature drop, whereas a ratio of 1:2 achieves and exceeds the desired target temperature.

TABLE 4

A summarized stream table for figure FIG. 2 cases.

| Stream Name | Hot | Cold | Mixture |
|---|---|---|---|
| Ratio 1:1 | | | |
| Flow (kg/hour) | 1 | 1 | 2 |
| Temperature (° C.) | 1000 | 50 | 401 |
| Ratio 1:2 | | | |
| Flow (kg/hour) | 1 | 2 | 3 |
| Temperature (° C.) | 1000 | 50 | 193 |

The method and apparatus according to the present invention is implemented for reducing the corrosion of the condenser in CDC production. In addition the method allows increased recovery and reduction in metal- or metalloid halides leaving separation/collection vessel with gas stream to downstream unit operation by cooling/quenching the gaseous stream by direct contact of gaseous stream with aerosol metal- or metalloid halides of the same composition where the aerosol metal- or metalloid chlorides exhibit a temperature of under 200° C.

The invention claimed is:

1. A method for reducing corrosion of a condenser in CDC production, comprising a step of cooling/quenching a gaseous stream metal or metalloid halide by direct contact of the gaseous stream with a liquid cooling agent before entering the condenser, without utilizing a heat exchanger for a temperature range above 300° C., while keeping purity of the gaseous stream of metal or metalloid halide constant.

2. The method according to claim 1, wherein reduction of temperature of the gaseous stream of metal or metalloid halide is performed before an inlet of the condenser, and wherein the temperature of the gas stream entering the condenser is reduced by the liquid cooling agent led into direct contact with the gaseous stream.

3. The method according to claim 2, wherein the cooling agent is a liquid metal- or metalloid halide of same chemical composition as the metal- or metalloid halide being condensed from the gaseous stream.

4. An apparatus for carbon production via extraction of non-carbon atoms from a metal- or metalloid carbide comprising:
- a reactor for a halogenation of carbide to carbon conversion with a gas stream by-product of metal or metalloid chloride;
- a condenser for collecting the gas stream by-product;
- a cooling unit comprising a tank of a liquid cooling agent;
- a supply pump connected to the tank;
- a supply flow valve connected to the condenser and the supply pump; and
- a return flow valve and a pressure relief valve connected to the supply pump and the cooling unit,
- wherein the temperature of the gas stream by-product entering the condenser is reduced by heat absorbed from vaporization of a liquid metal or metalloid halide introduced from the tank of liquid cooling agent with the supply pump through the supply flow valve into the gas stream by-product at the exit of the reactor.

5. The apparatus according to claim 4, wherein a flow rate of the gaseous stream of the metal or metalloid halide entering into the condenser is controlled by the supply flow valve via manipulating said supply flow valve opening on a discharge of pump, wherein the supply flow valve opening is controlled by a temperature sensor after cooling/quenching section, the flow rate of the gaseous stream entering into the condenser can be controlled by return valve.

6. The apparatus according to claim 4, wherein safety of the cooling unit is controlled by the pressure relief valve connected to the supply pump where the cooling agent is directed back to the tank by opening the pressure relief valve if the detected pressure exceeds a predetermined value.

* * * * *